(12) United States Patent
Nitschke et al.

(10) Patent No.: US 10,894,736 B2
(45) Date of Patent: Jan. 19, 2021

(54) GLASS SHEET POSITIONING APPARATUS AND METHOD

(71) Applicant: GLASSTECH, INC., Perrysburg, OH (US)

(72) Inventors: David B. Nitschke, Perrysburg, OH (US); Chad E. Cox, Whitehouse, OH (US)

(73) Assignee: GLASSTECH, INC., Perrysburg, OH (US)

( * ) Notice: Subject to any disclaimer, the term of this patent is extended or adjusted under 35 U.S.C. 154(b) by 149 days.

(21) Appl. No.: 15/772,869

(22) PCT Filed: Nov. 2, 2016

(86) PCT No.: PCT/US2016/059994
§ 371 (c)(1),
(2) Date: May 2, 2018

(87) PCT Pub. No.: WO2017/079201
PCT Pub. Date: May 11, 2017

(65) Prior Publication Data
US 2020/0255318 A1      Aug. 13, 2020

Related U.S. Application Data

(60) Provisional application No. 62/249,702, filed on Nov. 2, 2015.

(51) Int. Cl.
*B65G 47/24* (2006.01)
*C03B 35/16* (2006.01)
*B65G 49/06* (2006.01)

(52) U.S. Cl.
CPC ............ *C03B 35/163* (2013.01); *B65G 47/24* (2013.01); *B65G 49/067* (2013.01); *C03B 2225/02* (2013.01)

(58) Field of Classification Search
CPC ...... B65G 47/24; B65G 49/067; C03B 15/163
(Continued)

(56) References Cited

U.S. PATENT DOCUMENTS 3,992,182 A     11/1976  Frank
4,058,200 A  *  11/1977  Frank .................... B65G 47/24
                                                    198/382

(Continued)

FOREIGN PATENT DOCUMENTS

CN          1047665 A       12/1990
CN          1384074 A       12/2002
(Continued)

OTHER PUBLICATIONS

Brazilian Preliminary Examination Report Application No. BR112018008791-2 dated Mar. 25, 2020, English Machine Translation.
(Continued)

*Primary Examiner* — Douglas A Hess
(74) *Attorney, Agent, or Firm* — Brooks Kushman P.C.

(57) ABSTRACT

A glass sheet processing system for processing a glass sheet includes a conveyor for conveying the glass sheet in a direction of conveyance, and a positioning apparatus for adjusting position of the glass sheet on the conveyor. The positioning apparatus includes a movable carriage having first and second carriage bodies. The first carriage body is translatable in the direction of conveyance, and the second carriage body is supported by the first carriage body such that the second carriage body is movable in a direction generally transverse to the direction of conveyance. The positioning apparatus further includes a first drive assembly for moving the first carriage body in the direction of conveyance, a second drive assembly for moving the second carriage body with respect to the first carriage body, and a
(Continued)

positioner member connected to the second carriage body for contacting the glass sheet to adjust position of the glass sheet.

28 Claims, 7 Drawing Sheets

(58) Field of Classification Search
USPC ............... 198/376, 378, 379, 382, 394, 416
See application file for complete search history.

(56) References Cited

U.S. PATENT DOCUMENTS

| | | | |
|---|---|---|---|
| 4,197,108 A * | 4/1980 | Frank | C03B 23/03 65/273 |
| 4,199,341 A * | 4/1980 | Petrella | C03B 23/0315 65/104 |
| 4,420,362 A * | 12/1983 | Valimont | B32B 17/10889 156/556 |
| 4,439,264 A * | 3/1984 | Valimont | B32B 17/10036 156/556 |
| 4,475,937 A * | 10/1984 | Nitschke | B65G 43/10 65/163 |
| 4,802,904 A | 2/1989 | Boutier et al. | |
| 4,838,920 A | 6/1989 | Blasquez-Gonzales et al. | |
| 4,883,526 A | 11/1989 | Enk et al. | |
| 4,895,244 A | 1/1990 | Flaugher et al. | |
| 4,976,766 A | 12/1990 | Kuster et al. | |
| 4,985,059 A * | 1/1991 | Letemps | C03B 23/0254 65/62 |
| 5,028,202 A * | 7/1991 | Katada | B32B 17/10954 198/434 |
| 5,131,937 A * | 7/1992 | Kuster | B65G 47/244 65/181 |
| 5,403,369 A | 4/1995 | McMaster | |
| 6,032,491 A * | 3/2000 | Nitschke | C03B 23/0302 425/182 |
| 6,301,930 B1 | 10/2001 | Warner et al. | |
| 6,918,268 B2 | 7/2005 | Fukai et al. | |
| 7,571,801 B2 * | 8/2009 | Bavelloni | B65G 49/064 198/626.1 |
| 7,712,334 B2 * | 5/2010 | Kanno | C03B 23/0254 65/106 |
| 7,716,949 B2 * | 5/2010 | Bennett | C03B 23/03 65/106 |
| 8,132,428 B2 | 3/2012 | Vild et al. | |
| 8,256,244 B2 | 9/2012 | Imaichi et al. | |
| 8,789,392 B2 * | 7/2014 | Cleary | C03B 35/24 65/182.2 |
| 8,881,551 B2 * | 11/2014 | Nitschke | C03B 23/03 65/323 |

FOREIGN PATENT DOCUMENTS

| | | |
|---|---|---|
| JP | H06247729 A | 9/1994 |
| JP | H09502692 A | 3/1997 |
| JP | 2002-293561 A | 10/2002 |
| JP | 3433462 B2 | 8/2003 |
| JP | 2003335534 A | 11/2003 |
| JP | 2005206458 A | 8/2005 |
| SU | 785238 A1 | 12/1980 |
| TW | M444367 U | 1/2013 |
| WO | 2007125973 A1 | 11/2007 |

OTHER PUBLICATIONS

PCT Notification of Transmittal of the International Search Report and the Written Opinion of the International Searching Authority dated Jan. 31, 2017, Application No. PCT/US16/59994, Applicant Glasstech, Inc., 9 Pages.
PCT Internatinal Preliminary Report on Patentability dated May 8, 2018, Application No. PCT/US2016/059994, Applicant Glasstech, Inc., 7 Pages.
Extended European Search Report dated Jun. 11, 2019, Application No. 16862824.6-1105 / 3371117, Applicant Glasstech, Inc., 9 Pages.
Russian Office Action and Search Report dated Mar. 12, 2020 (with English Machine Translation), Application No. 2018119346/03(030428), Applicant Glasstech, Inc. (12 Pages).
Russian Office Action & Search Report Application No. 2018119346/03(030428) dated Mar. 12, 2020, English Machine Translation.
SU 785238 A1, Machine Translation—Description & Claims (Abstract Not Available).
Brazilian Preliminary Examination Report dated Mar. 25, 2020 (with English Machine Translation), Application No. BR112018008791-2 Applicant Glasstech, Inc., (9 Pages Total).
Chinese First Office Action dated Sep. 3, 2020 (with English translation), Application No. 201680064026.X, Applicant Glasstech, Inc., 17 pages.
Japanese Office Action dated Oct. 27, 2020 (with English Machine Translation), Application No. 2018-522645, 12 Pages.
Taiwanese Office Action dated Nov. 16, 2020, Application No. 105135357, 9 Pages.
Taiwanese Search Report dated Nov. 16, 2020 (with English Machine Translation), Application No. 105135357, 2 Pages.

* cited by examiner

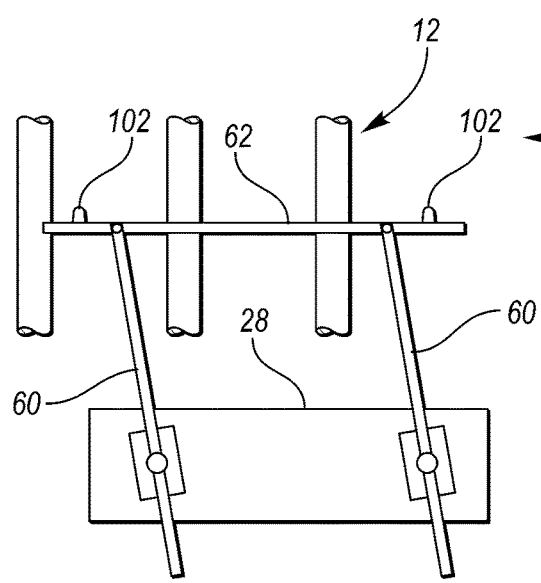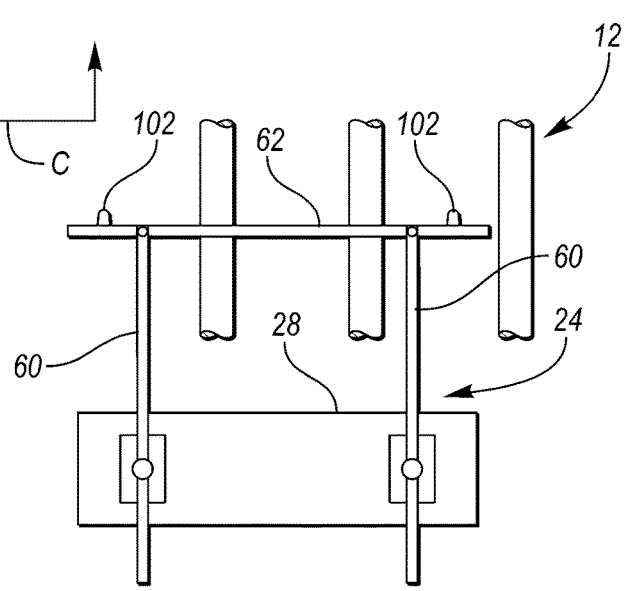
FIG. 7B  FIG. 7A

GLASS SHEET POSITIONING APPARATUS AND METHOD

CROSS-REFERENCE TO RELATED APPLICATIONS

This application is the U.S. national phase of PCT Application No. PCT/US2016/059994 filed on Nov. 2, 2016, which claims the benefit of U.S. provisional patent application Ser. No. 62/249,702, filed on Nov. 2, 2015, the disclosures of which are incorporated in their entirety by reference herein.

TECHNICAL FIELD

The present disclosure relates to a glass sheet positioning apparatus for a glass processing system, a glass processing system including such a positioning apparatus, and a method for adjusting position of a glass sheet on a conveyor of a glass processing system.

BACKGROUND

A prior apparatus for positioning heated glass sheets is disclosed in U.S. Pat. No. 4,976,766.

SUMMARY

A positioning apparatus, according to the present disclosure, is provided for use with a glass sheet processing system for adjusting position of a glass sheet on a conveyor of the glass sheet processing system, wherein the conveyor is configured to convey the glass sheet in a direction of conveyance. The positioning apparatus may include a carriage configured to be attached to the glass sheet processing system and including first and second carriage bodies. The first carriage body is configured to be attached to the glass sheet processing system such that the first carriage body is translatable in the direction of conveyance, and the second carriage body is configured to be supported by the first carriage body such that the second carriage body is movable in a direction generally transverse to the direction of conveyance. The positioning apparatus may further include a first motor for moving the first carriage body in the direction of conveyance, a second motor for moving the second carriage body with respect to the first carriage body, and a positioner member configured to be connected to the second carriage body and to contact the glass sheet to adjust position of the glass sheet with respect to the conveyor.

A glass sheet processing system, according to the present disclosure, for processing a glass sheet may include a conveyor for conveying the glass sheet in a direction of conveyance, and a positioning apparatus for adjusting position of the glass sheet on the conveyor. The positioning apparatus includes a movable carriage having first and second carriage bodies, wherein the first carriage body is translatable in the direction of conveyance, and the second carriage body is supported by the first carriage body such that the second carriage body is movable in a direction generally transverse to the direction of conveyance. The positioning apparatus may further include a first drive assembly for moving the first carriage body in the direction of conveyance, a second drive assembly for moving the second carriage body with respect to the first carriage body, and a positioner member connected to the second carriage body and configured to contact the glass sheet to adjust position of the glass sheet with respect to the conveyor. Furthermore, the drive assemblies are configured to be operated independently.

A method according to the present disclosure for adjusting position of a glass sheet on a conveyor of a glass sheet processing system may include moving a carriage including first and second carriage bodies along the glass sheet processing system, using a first motor associated with the first carriage body, to achieve a desired speed of the carriage. The method may further include moving the second carriage body with respect to the first carriage body using a second motor associated with the second carriage body, and contacting the glass sheet with a positioner member connected to the second carriage body to adjust the position of the glass sheet with respect to the conveyor.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 7A is a schematic top view of the positioning arrangement and second carriage body showing a first position of the positioning arrangement lowered into contact with the conveyor; and FIG. 7B is a schematic top view of the positioning arrangement and second carriage body showing a second position of the positioning arrangement, in which the positioning member is translated longitudinally with respect to the second carriage body and moved laterally inward with the second carriage body (the amount of longitudinal translation of the positioning member is shown in exaggerated fashion).

DETAILED DESCRIPTION

As required, detailed embodiments are disclosed herein. It is to be understood, however, that the disclosed embodiments are merely exemplary and that various and alternative forms are possible. Furthermore, the figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

During manufacture of a glass sheet product, such as a glass mirror panel for a solar power collection application, a vehicle windshield, rear window, or any other suitable product, it may be desirable to reposition a sheet of glass with respect to a conveyor in connection with a forming or bending operation, or in connection with any other glass processing operation, to ensure that the glass sheet is in a proper position for processing of the glass sheet. In the present disclosure, methods and apparatuses are provided for positioning glass sheets in connection with such operations to improve glass processing.

Figure 1:
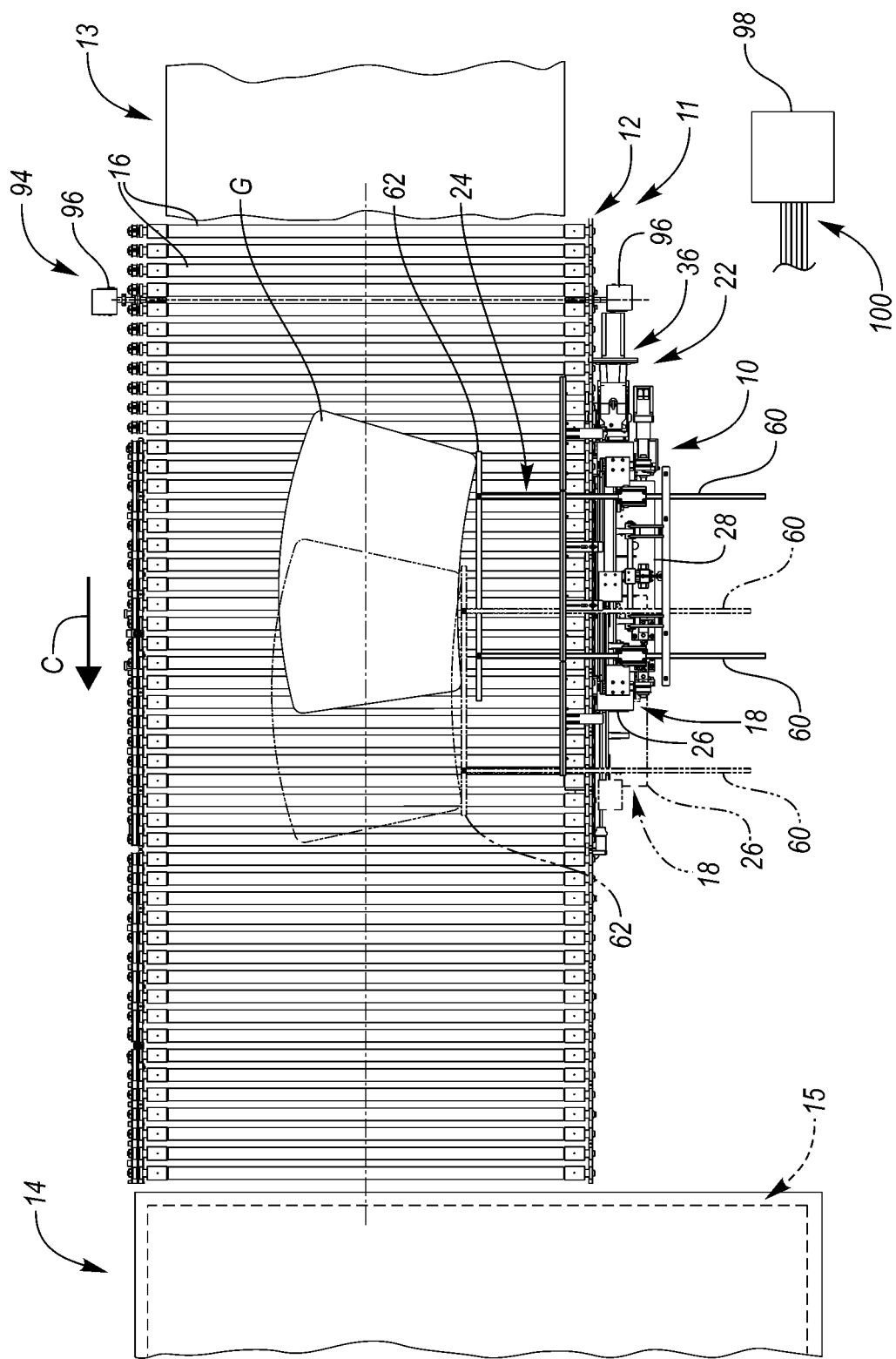
FIG. 1 is a fragmentary plan view of a glass processing system including a glass sheet positioning apparatus according to the present disclosure for adjusting position of glass sheets on a conveyor, wherein the glass processing system further includes a heating station for heating the glass sheets and a downstream forming or bending station for molding the glass sheets, and wherein a housing of the heating station is broken away to show details of the conveyor and positioning apparatus.

FIG. 1 shows a positioning apparatus 10, according to the present disclosure, for use with a glass sheet processing system 11 having a conveyor 12 for conveying glass sheets G, e.g., heated glass sheets, and one or more processing or treatment stations, such as a heating station or furnace 13 for heating the glass sheets, a forming or bending station 14 including a mold apparatus 15 (e.g., upper and lower molds, shown schematically in FIG. 1) for bending or molding each glass sheet, a cooling station (e.g., quenching or annealing station, not shown) for cooling the glass sheets, etc. In the embodiment shown in FIG. 1, the bending station 14 also includes a pickup area where each glass sheet G may be lifted off of the conveyor 12 and transported laterally, e.g., by a laterally movable shuttle or mold, so that a molding operation may be performed at a location laterally offset from the conveyor 12. Example embodiments of a glass processing system may be found in U.S. Pat. No. 9,452,948, which is hereby incorporated by reference in its entirety. Furthermore, while the conveyer 12 may be any suitable system for conveying the glass sheets G, in the embodiment shown in FIG. 1, the conveyer 12 is a roll conveyor including multiple rotatable rolls or rollers 16 and a drive system for rotating the rollers 16 to convey each glass sheet G along the plane of conveyance and in a direction of conveyance C. Examples of such a conveyor are disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al., which are hereby incorporated by reference.

The positioning apparatus 10 is disposed on a side of the glass processing system 11 and is configured to adjust position of a glass sheet G on the conveyor 12 as the glass sheet G moves along the conveyor 12 in the direction of conveyance C. Referring to FIGS. 1-4, the positioning apparatus 10 includes a movable carriage 18 supported on a support structure 20 of the glass processing system 11, a drive arrangement 22 for moving the carriage 18 with respect to the glass processing system 11, and a positioning arrangement 24 connected to the carriage 18 for positioning the glass sheet G with respect to the conveyor 12.

The carriage 18 includes a first carriage body 26 (e.g., first carriage frame) that is translatable along the support structure 20 in directions parallel to the direction of conveyance C, and a second carriage body 28 (e.g., second carriage frame) that is supported by the first carriage body 26 such that the second carriage body 28 is movable with respect to the first carriage body 26 in directions generally transverse to the direction of conveyance C. Referring to FIGS. 2-5, the first carriage body 26 may be supported by one or more longitudinally extending support members or guides, such as vertically spaced apart first and second longitudinal linear bearing rails 30 and 32, respectively, mounted on the support structure 20 (the bearing rails 30 and 32 may instead be considered part of the support structure 20). For example, the first carriage body 26 may include, or be connected to, one or more bearing blocks 33a that are slidably mounted on the first rail 30, and one or more rollers 33b that are engageable with the second rail 32. Likewise, the second carriage body 28 may be supported by one or more laterally extending support members, such as lateral linear bearing rails 34 connected to the first carriage body 26. While the carriage bodies 26 and 28 may have any suitable configuration, the first carriage body 26 in the illustrated embodiment includes vertically oriented, generally planar end portions that are oriented parallel to a vertically oriented, generally planar main body portion of the second carriage body 28.

The drive arrangement 22 may include any suitable drive mechanisms or drive devices for moving the carriage bodies 26 and 28. In the embodiment shown in FIGS. 2 and 4, the drive arrangement 22 includes a first drive assembly 36 for moving the first carriage body 26 longitudinally along the glass processing system 11, and a second drive assembly 38 for moving the second carriage body 28 laterally with respect to the first carriage body 26.

Figure 2:
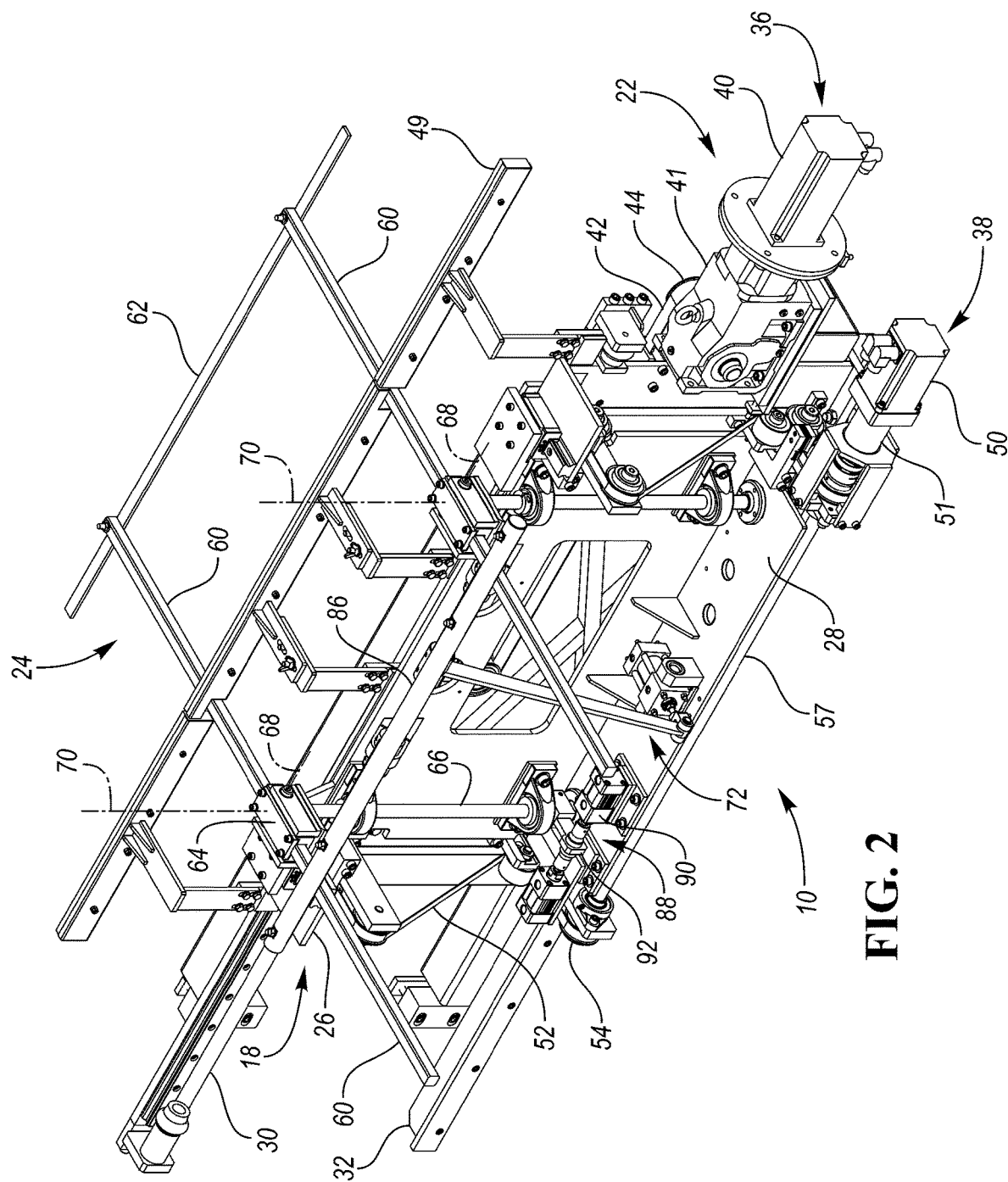
FIG. 2 is a perspective view of the positioning apparatus, which includes a movable carriage supported on a support structure of the glass processing system, a drive arrangement for moving the carriage with respect to the glass processing system, and a positioning arrangement connected to the carriage for positioning a glass sheet with respect to the conveyor.

The first drive assembly 36 includes a first motor 40 (e.g., an electric motor, pneumatic motor, hydraulic motor, etc.) connected to and supported by the support structure 20, and related first drive components associated with the first motor 40 for moving the first carriage body 26 with respect to the bearing rails 30 and 32, along with the second carriage body 28. The related first drive components may include, for example, a first gearbox 41 connected to the first motor 40, and a first drive member 42, such as a drive rod, chain, or belt connected to the first motor 40 via the first gearbox 41. As a more specific example, the first drive member 42 may be a timing belt that is connected to a first drive sprocket or pulley 44, which may be rotatably mounted on the gearbox 41 as shown in FIG. 2 (or otherwise rotatably mounted on the support structure 20) and driven by the first motor 40, and a first idler bearing or pulley 46 that is mounted on the support structure 20 at a location spaced longitudinally away from the first drive pulley 44. The first drive member 42 may further be connected to the first carriage body 26 at a first connection location 48 (shown best in FIG. 5), which may be located between the first drive pulley 44 and the first idler pulley 46 at all positions of the first carriage body 26.

With the above configuration, the first motor 40 is operable to rotate the first drive pulley 44 in a first direction, such that the first drive pulley 44 may move the first drive member 42 in a first direction in order to move the first carriage body 26 in the direction of conveyance C from an initial position, shown in solid lines in FIG. 1, to a translated position, shown in phantom lines in FIG. 1. The first motor 40 is also operable to rotate the first drive pulley 44 in a second direction opposite the first direction, such that the first drive pulley 44 may move the first drive member 42 in an opposite direction in order to move the first carriage body 26 in a direction opposite the direction of conveyance C from the translated position back to the initial position. The positioning apparatus 10 may also include a seal member 49 connected to the first carriage body 26 for sealing an opening in the glass processing system 11, such as a longitudinal slot in the heating station 13, as the first carriage body 26 translates with respect to the glass processing system 11.

Figure 3:
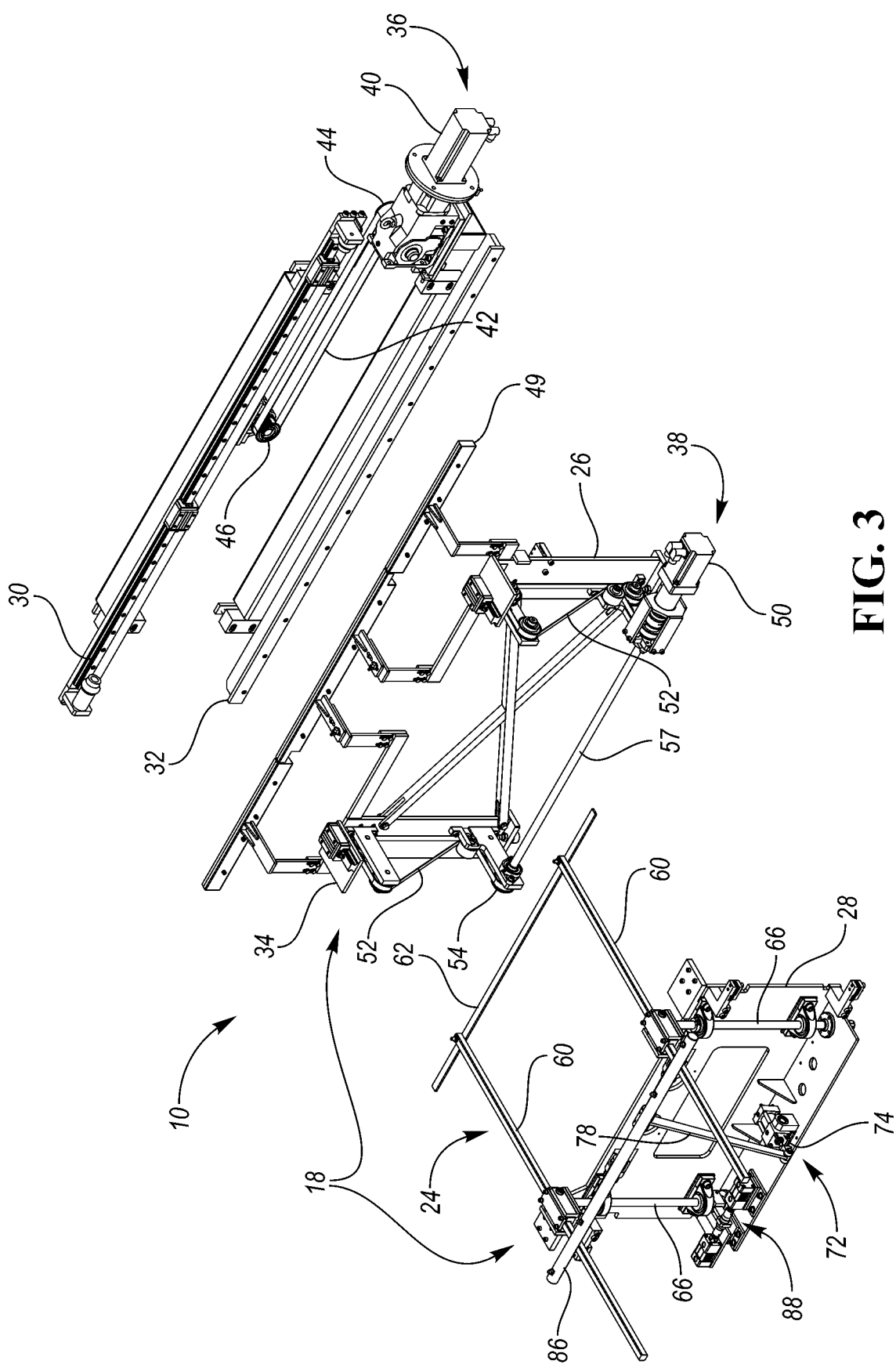
FIG. 3 is an exploded perspective view of the positioning apparatus showing first and second carriage bodies of the carriage spaced away from each other, and spaced away from support rails on which the first carriage body is translatable.

Referring to FIGS. 2-4 and 5, the second drive assembly 38 includes a second motor 50 (e.g., an electric motor, pneumatic motor, hydraulic motor, etc.) connected to the first carriage body 26, and related second drive components associated with the second motor 50 for moving the second carriage body 28 laterally with respect to the first carriage body 26. The related second drive components may include, for example, a second gearbox 51 connected to the second motor 50, and one or more second drive members 52, such as drive rods, chains, or belts, connected to the second motor 50 via the second gearbox 51. In the illustrated embodiment, the second drive components include two second drive members 52, and each second drive member 52 is a timing belt that is connected to a second drive sprocket or pulley 54, which is driven by the second motor 50, and one or more second idler bearings or pulleys 56 that are connected to the first carriage body 26 at locations spaced away from the second drive pulley 54. The second drive components may also include a synchronization shaft 57 connected to the second motor 50 (e.g., by the second gearbox 51 as shown in FIG. 3) and each of the second drive pulleys 54 (e.g., the shaft 57 may extend between the second drive pulleys 54) so that the second motor 50 may simultaneously rotate both second drive pulleys 54. Each second drive member 52 may further be connected to the second carriage body 28 at one or more second connection locations 58 (shown best in FIG. 5) so that movement of the second drive members 52 causes movement of the second carriage body 28 along the lateral bearing rails 34. In the embodiment shown in FIGS. 2, 4 and 5, the second drive members 52 are disposed at opposite ends of the first carriage body 26, and each second drive member 52 is connected to the second carriage body 28 at upper and lower connection locations 58 (e.g., 4 total connection locations) to facilitate movement of the second carriage body 28 (e.g., reduce tilting of the second carriage body 28 and/or insure that the second carriage body 28 remains parallel to the first carriage body 26) as the second carriage body 28 moves laterally with respect to the first carriage body 26.

Figure 5:
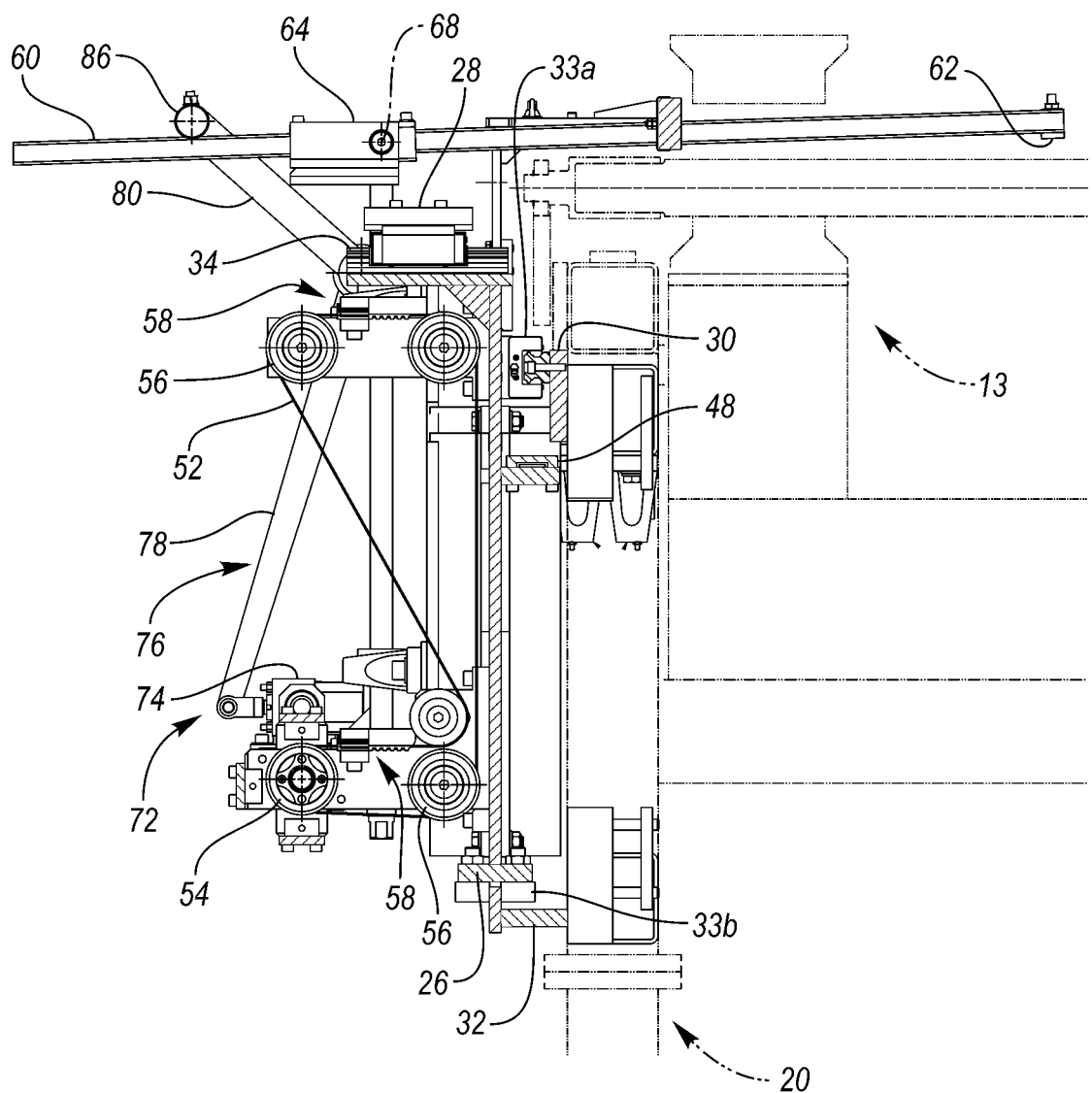
FIG. 5 is a side view of the positioning apparatus showing a glass sheet positioner or positioning member in a raised position, wherein the positioning member is also shown in a laterally retracted position.
Figure 6:
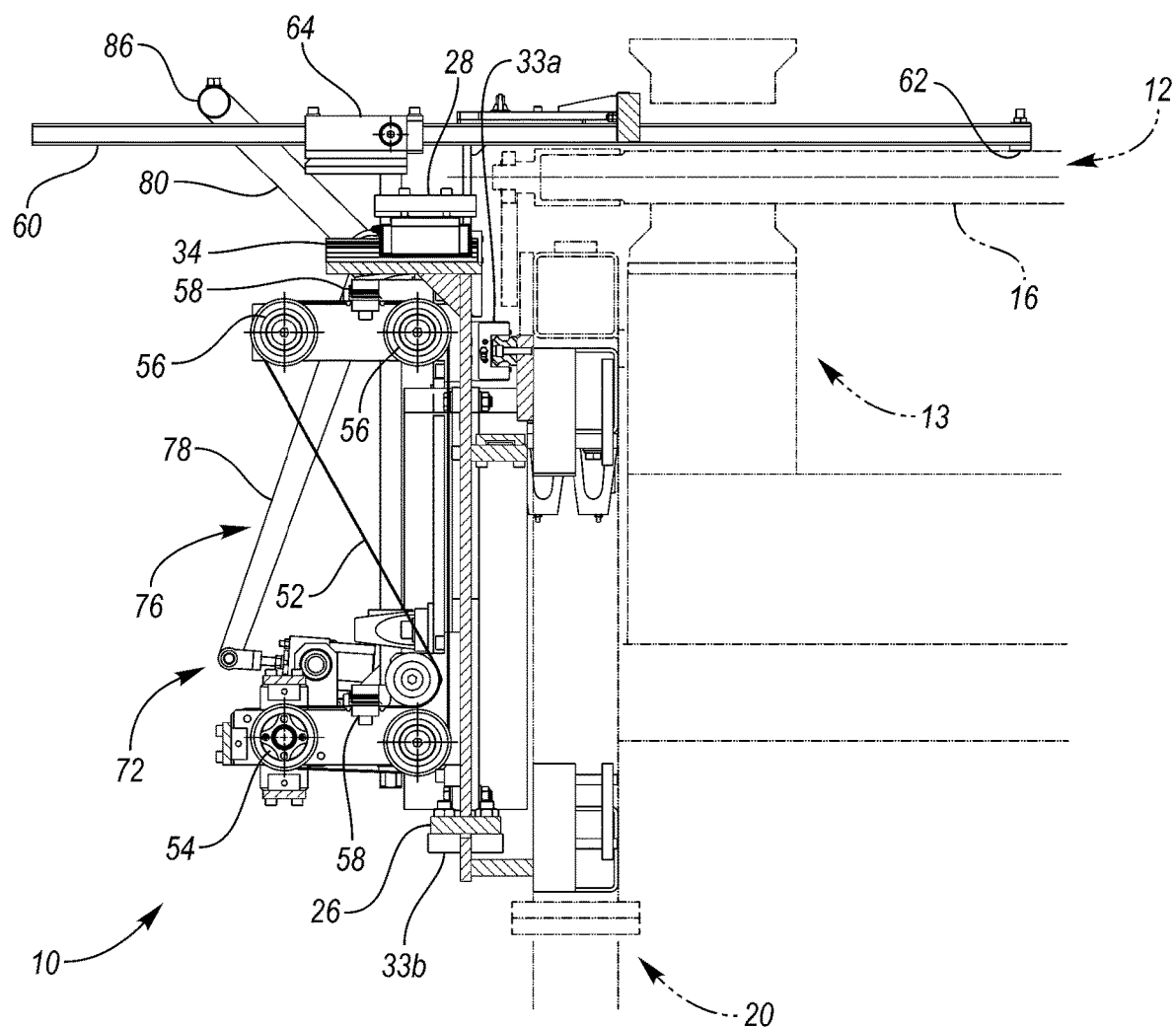
FIG. 6 is a side view of the positioning apparatus similar to FIG. 5, and showing the positioning member in a lowered position in contact with the conveyor of the glass processing system, wherein the positioning member is also shown in a laterally extended position.

With the above configuration, the second motor 50 is operable to rotate each second drive pulley 54 in a first direction, such that the second drive pulleys 54 may each move the corresponding second drive member 52 in a first direction in order to move the second carriage body 28 toward the conveyor 12 and transverse to the direction of conveyance C from a first position shown in FIG. 5 to a second position shown in FIG. 6. The second motor 50 is also operable to rotate each second drive pulley 54 in a second direction opposite the first direction, such that the second drive pulleys 54 may each move the corresponding second drive member 52 in an opposite direction in order to move the second carriage body 28 away from the conveyor 12 and transverse to the direction of conveyance C from the second position to the first position.

Returning to FIGS. 1 and 2, the positioning arrangement 24 is connected to the second carriage body 28 and is movable with the second carriage body 28. The positioning arrangement 24 includes first and second support members 60, such as elongated arms, pivotally connected to the second carriage body 28, and a positioner or positioning member 62, such as a positioning bar or rod, pivotally connected to end portions of the support members 60. The support members 60 are pivotable between a raised position, shown in FIG. 5, and a lowered position, shown in FIG. 6, in order to move the positioning member 62 between a raised position and a lowered use position. The support members 60 may also be configured to pivot side-to-side to move the positioning member 62 longitudinally (i.e., in a direction generally parallel to the direction of conveyance C) with respect to the second carriage body 28, or in response to longitudinal movement of the positioning member 62, as explained below in detail.

While the support members 60 may be pivotally connected to the second carriage body 28 in any suitable manner, in the illustrated embodiment, each support member 60 is pivotally connected to a compliant joint 64, such as with a pivot pin, so that each support member 60 is pivotable about a horizontal axis 68 shown in FIG. 2, and the compliant joint 64 is connected to a vertically extending support 66, which is supported by the second carriage body 28. Each vertically extending support 66 is also rotatably connected to the second carriage body 28 such that each vertically extending support 66 is rotatable about a vertical axis 70. As a result, each support member 60 and corresponding joint 64 may likewise pivot about a respective vertical axis 70 to move the positioning member 62 longitudinally (i.e., in a direction generally parallel to the direction of conveyance C) with respect to the second carriage body 28, or in response to longitudinal movement of the positioning member 62.

Figure 4:
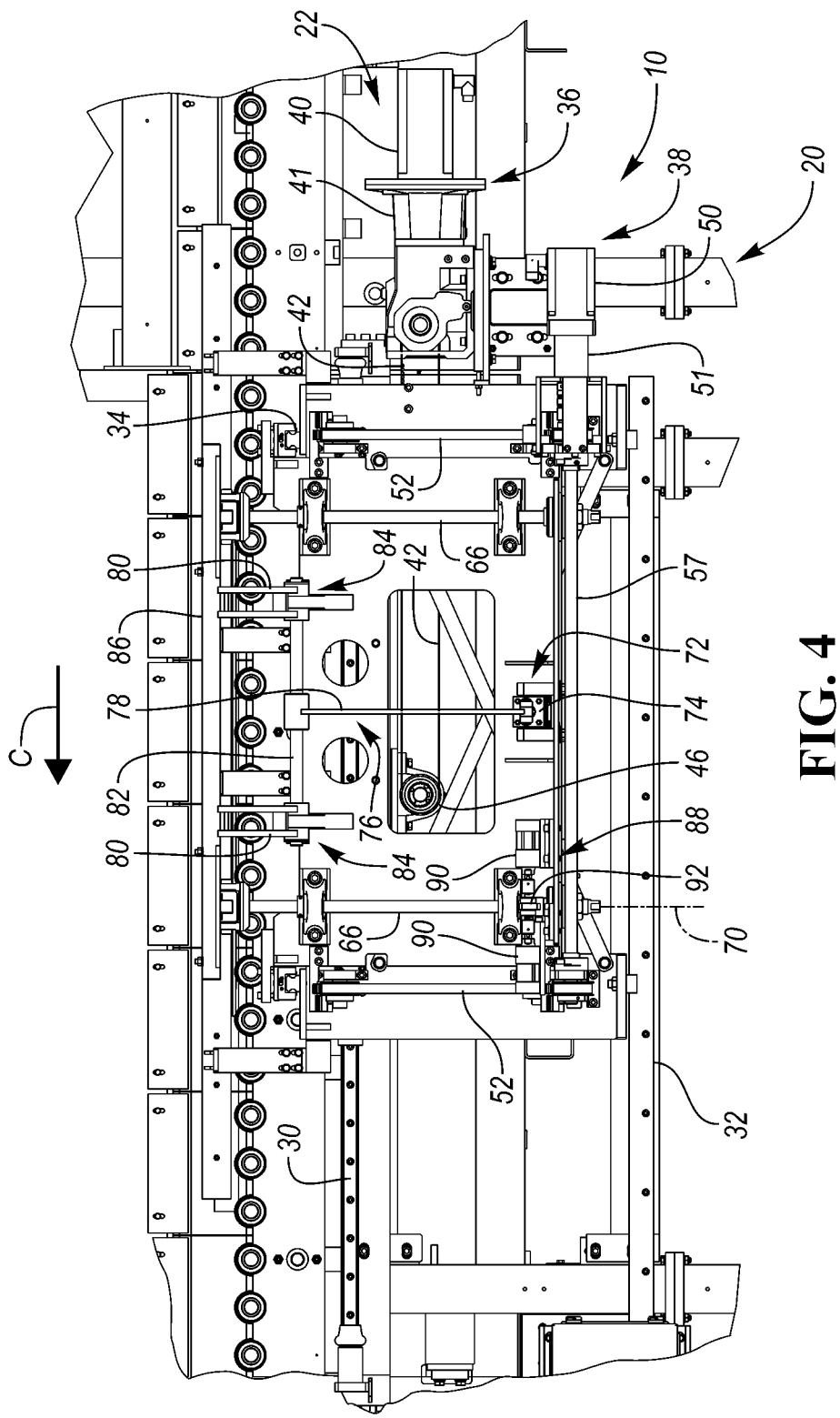
FIG. 4 is a front view of the positioning apparatus shown mounted on a support frame or structure of the glass processing system, which support structure may be supported on a factory floor for example.

To raise or lower the positioning member 62, the positioning apparatus 10 may include a suitable lift drive assembly 72 connected to or otherwise associated with the support members 60. Referring to FIGS. 4 and 5, the lift drive assembly 72 may include an automatic actuator 74, such as a piston/cylinder device (e.g., hydraulic or pneumatic cylinder) or motor (e.g., an electric motor, pneumatic motor, hydraulic motor, etc.), connected to a link arrangement 76, which may include one or more links pivotally connected to the second carriage body 28. In the embodiment shown in FIGS. 4 and 5, for example, the link arrangement 76 includes a lower link 78 fixedly connected to two upper links 80 that are pivotally connected to an upper portion of the second carriage body 28, such as via a horizontal member 82 (e.g., a bar or tube) that is fixedly connected to the lower link 78 and the upper links 80 and that is rotatably received in receptacles 84 formed on or connected to the second carriage body 28. Furthermore, the lift drive assembly 72 includes an engagement member 86 (e.g., engagement bar) connected to the link arrangement 76 (e.g, the upper links 80) and connected to or otherwise engageable with the support members 60. With the above configuration, and referring to FIGS. 5 and 6, the actuator 74 is operable to pivot the link arrangement 76 counterclockwise in order to raise the support members 60 and positioning member 62 from the lowered position shown in FIG. 6 to the raised position shown in FIG. 5. The actuator 74 is also operable to pivot the link arrangement 76 clockwise to lower the support members 60 and positioning member 62 from the raised position shown in FIG. 5 to the lowered position shown in FIG. 6. Furthermore, the support members 60 and positioning member 62 may be configured to move due to their own weight when the link arrangement 76 is pivoted clockwise. As shown in FIG. 6, the link arrangement 76 may also be rotated clockwise to such an extent that the engagement member 86 disengages the support members 60.

To cause or enable longitudinal movement of the positioning member 62 with respect to the second carriage body 28, the positioning apparatus 10 may likewise include a suitable sway drive assembly 88 connected to or otherwise associated with one or both of the vertical supports 66. Referring to FIGS. 2 and 4, for example, the sway drive assembly 88 may include two automatic actuators 90, such as piston/cylinder devices (e.g., hydraulic or pneumatic cylinders) or motors (e.g., electric motors, pneumatic motors, hydraulic motors, etc.) that face each other and are configured to engage a portion of one of the vertical supports 66 (e.g., a tab or projection 92 formed on or otherwise connected to a main body of the vertical support 66). The actuators 90 may be activated to engage the projection 92 to thereby rotate the vertical support 66 about its vertical axis 70 to a home position, which causes the support members 60, the positioning member 62 and the other vertical support 66 to return to home positions in which the positioning member 62 forms a predetermined angle, such as a right angle, with each of the support members 60.

The actuators 90 may also be deactivated or otherwise operated so that ends of the actuators 90 disengage the projection 92 and move away from each other and the projection 92, such that the vertical support 66 is free to rotate about its vertical axis 70, and so that both support members 60 are likewise free to rotate about their respective vertical axes 70. As a result, the positioning member 62 is able to move longitudinally with respect to the second carriage body 28 and in a direction generally parallel to the direction of conveyance C if, for example, the speed of the second carriage body 28 in the direction of conveyance C is not the same as the speed of the conveyor 12 when the positioning member 62 contacts the conveyor 12. More generally, the positioning member 62 may be enabled or allowed to move with respect to the second carriage body 28 and in a direction parallel to the plane of conveyance of the glass sheet G when the positioning member 62 is in the lowered use position. The positioning apparatus 10 therefore provides a speed compensation or compliance feature for the positioning member 62 relative to the conveyor 12. Furthermore, the support members 60 and positioning member 62 cooperate to form a movable parallelogram configuration along with the second carriage body 28.

The support members 60 may also be manually adjusted with respect to the joints 64 to achieve a desired spacing between the positioning member 62 and the joints 64. For example, each joint 64 may include a clamp device that may be loosened in order to slide a respective support member 60 with respect to the joint 64, and then tightened when the desired position of the support member 60 is achieved. This feature may be useful if, for example, the positioning apparatus 10 will be used with a particular application in which glass sheets will be spaced relatively far away or relatively close to the carriage 18 as the glass sheets move along the conveyor 12.

The components of the positioning apparatus 10 may be made of any suitable material and in any suitable manner. For example, the carriage bodies 26, 28, support members 60 and positioning member 62 may be made of any suitable metal, such as stainless steel.

Returning to FIG. 1, the positioning apparatus 10 may further include a sensing system 94 including one or more sensors 96 for sensing or detecting position of the glass sheet G on the conveyor 12. The sensors 96 may be any suitable sensors, such as optical sensors, radar sensors, photodetectors (electric eyes), etc. Furthermore, the position information may be used in connection with controlling operation of the the positioning apparatus 10. For example, activation and/or deactivation of the various drive assemblies 36, 38, 72 and 88 may be based on the position information.

In addition, the positioning apparatus 10 includes a controller or control unit 98 for communicating with and/or controlling operation of the above components. The control unit 98 may have a bundle of connections 100 for connecting with the various components of the positioning apparatus 10, such as the drive assemblies 36, 38, 72 and 88 and sensors 96. Furthermore, the control unit 98 may include any suitable hardware and/or software for controlling operation of the positioning apparatus 10 (e.g., for performing the particular algorithms represented by the functions described herein). For example, the control unit 98 may include one or more processors in communication with one or more storage devices or memory units, which include computer readable program instructions that are executable by the one or more processors so that the control unit 98 may control operation of and/or communicate with the drive assemblies 36, 38, 72 and 88, sensors 96, etc. The control unit 98 may also, or instead, include one or more application specific integrated circuits, programmable gate arrays, programmable logic devices, and/or digital signal processors. In lieu of the connections 100, the control unit 98 may instead be configured to connect wirelessly to one or more of the above components. Furthermore, the control unit 98 may also control the rest of the glass processing system 11, such as the conveyor 12, heating station 13, bending station 14, etc., or be configured to communicate with another control unit that controls operation of the rest of the glass processing system 11, and that may have a similar configuration as the control unit 98.

Referring to FIGS. 1-7, operation of the positioning apparatus 10 will now be described in more detail. As the glass sheet G is being conveyed by the conveyor 12 in the direction of conveyance C along a portion of the glass processing system 11 (e.g., such as along the heating station 13 in which the glass sheet G is heated to a temperature in the range of 575° C. to 675° C., or to a temperature of at least 575° C., for example), the positioning apparatus 10 may be operated to adjust position of the glass sheet G to ensure that the glass sheet G is in the proper orientation for receipt in a downstream treatment station (e.g., bending station 14). For example, when the one or more sensors 96 detect that the glass sheet G has reached a predetermined position on the conveyor 12, the control unit 98 may activate the first drive assembly 36 to accelerate the carriage 18 including the carriage bodies 26 and 28 from the initial position, shown in solid lines in FIG. 1, so that the carriage 18 reaches a speed that approximates the speed of the conveyor 12 (i.e., the speed at which the glass sheet G is moving relative to the support structure 20). During at least a portion of the acceleration period, the position member 62 may be held in its raised position and home position (e.g, such that the position member 62 forms a right angle with each of the support members 60). When a desired speed of the carriage 18 in the direction of conveyance C is achieved, the lift drive assembly 72 may be operated to lower the positioning member 62 toward the conveyor 12 until the positioning member 62 contacts rollers 16 of the conveyor 12.

Before, during, or after lowering of the positioning member 62, the sway drive assembly 88 may be deactivated or operated to enable the positioning member 62 to move longitudinally with respect to the second carriage body 28. As a result, and as mentioned above, the positioning member 62 may move longitudinally with respect to the second carriage body 28 if, for example, the speed of the second carriage body 28 in the direction of conveyance C is not the same as the speed of the conveyor 12 when the positioning member 62 contacts the conveyor 12. Referring to FIGS. 7A and 7B, for example, the support members 60 may pivot counterclockwise to allow the positioning member 62 to move longitudinally in the direction of conveyance C, and parallel to the plane of conveyance, if the speed of the second carriage body 28 is less than the speed of the conveyor 12 when the positioning member 62 contacts the conveyor 12. As another example, the support members 60 may pivot clockwise to allow the positioning member 62 to move longitudinally in a direction opposite the direction of conveyance C if the speed of the second carriage body 28 is greater than the speed of the conveyor 12 when the positioning member 62 contacts the conveyor 12.

When the positioning member 62 is in contact with conveyor 12, for example the second drive assembly 38 may be operated independently of the first drive assembly 36 to move the second carriage body 28 and the positioning member 62 laterally with respect to the first carriage body 26, in order for the positioning member 62 to contact the glass sheet G and adjust the position of the glass sheet G relative to the conveyor 12, if necessary. Advantageously, the positioning apparatus 10 may be operated so that the positioning member 62 is moving at the same speed as the glass sheet G in the direction of conveyance C when the positioning member 62 contacts the glass sheet G so that scuff marks on the glass sheet G may be minimized or eliminated. Furthermore, referring to FIG. 1, the positioning member 62 may adjust lateral position and/or angular orientation of the glass sheet G with respect to the conveyor 12 as the glass sheet G moves along the conveyor 12. Furthermore, the positioning member 62 may have a main body and one or more projections 102 (shown schematically in FIGS. 7A and 7B) that extend from the main body for contacting the glass sheet G.

When the carriage 18 reaches the downstream translated position shown in phantom lines in FIG. 1, or at any suitable time beforehand, the second drive assembly 38 may be operated to pull the positioning member 62 out of contact with the glass sheet G, the sway drive assembly 88 may be operated to return the positioning member 62 to its home position, if needed, and the lift drive assembly 72 may be operated to raise the positioning member 62 from the lowered use position shown in FIG. 6 to the raised position shown in FIG. 5. Furthermore, the lift drive assembly 72 may be operated to raise the positioning member 62 from the lowered use position before the sway drive assembly 88 is operated to return the positioning member 62 to its home position thereby inhibiting scuffing of the positioning member 62 on the rollers 16 of the conveyor 12. Both drive assemblies 36 and 38 may also continue to operate to return the carriage bodies 26 and 28 to their initial starting or home positions in preparation for the next glass sheet.

Generally then, a method according to the present disclosure for adjusting position of a glass sheet on a conveyor of a glass sheet processing system may include moving a carriage including first and second carriage bodies along the glass sheet processing system, using a first drive assembly (e.g., first motor) associated with the first carriage body, to achieve a desired speed of the carriage. The method may further include moving the second carriage body with respect to the first carriage body using a second drive assembly (e.g, second motor) associated with the second carriage body, and contacting the glass sheet with a positioning member connected to the second carriage body to adjust the position of the glass sheet with respect to the conveyor. Furthermore, the method may involve moving the positioning member between a raised position and a lowered use position, in which the positioning member contacts the conveyor, before contacting the glass sheet with the positioning member, and allowing the positioning member to move with respect to the second carriage body and in a direction parallel to a plane of conveyance of the glass sheet when the positioning member is in the lowered use position.

The positioning apparatus 10 according to the present disclosure may provide various benefits. For example, because the first and second drive assemblies 36 and 38, respectively, may be operated independently, operation of each drive assembly may be specifically tailored to meet the demands of a particular application. Furthermore, because the positioning apparatus 10 includes the speed compensation feature discussed above, the speed of the positioning member 62 may be accurately matched to the speed of the glass sheet G thereby minimizing scratches to the glass sheet G. In addition, because the first carriage body 26 may be configured to ride along vertically spaced apart support members, angular movement of the first carriage body 26 may be inhibited or prevented.

While exemplary embodiments are described above, it is not intended that these embodiments describe all possible forms of the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A positioning apparatus for a glass sheet processing system for adjusting position of a heated glass sheet on a conveyor of the glass sheet processing system, wherein the conveyor is configured to convey the glass sheet in a direction of conveyance and the glass sheet processing system further includes a bending station for molding the glass sheet, the positioning apparatus comprising:

a carriage configured to be attached to the glass sheet processing system and including first and second carriage bodies, the first carriage body being configured to be attached to the glass sheet processing system such that the first carriage body is translatable in the direction of conveyance, and the second carriage body is configured to be supported by the first carriage body such that the second carriage body is movable in a direction generally transverse to the direction of conveyance;

a first motor for moving the first carriage body in the direction of conveyance;

a second motor for moving the second carriage body with respect to the first carriage body; and a positioner member configured to be connected to the second carriage body and configured to contact the glass sheet to adjust position of the glass sheet with respect to the conveyor, wherein the positioner member is movable between a raised position and a lowered use position when connected to the second carriage body, and wherein the positioner member is configured to contact the conveyor when the positioner member is in the lowered use position.

2. The positioning apparatus of claim 1 wherein the positioner member is movable with respect to the second carriage body to compensate for a speed difference between the conveyor and the first carriage body when the first carriage body is being translated in the direction of conveyance and the positioner member is in contact with the conveyor.

3. The positioning apparatus of claim 1 further comprising an arm configured to be connected to the positioner member and pivotally associated with the second carriage body such that the arm is pivotable about a vertical axis when the positioner member is in the lowered use position.

4. The positioning apparatus of claim 1 wherein the positioner member has a main body and multiple projections extending from the main body, wherein the projections are configured to contact the glass sheet.

5. The positioning apparatus of claim 1 further comprising a drive belt that is connectable to the first motor and the first carriage body for translating the first carriage body.

6. The positioning apparatus of claim 1 further comprising two drive members that are configured to be connected to the second motor and the second carriage body such that the drive members are spaced apart from each other in the direction of conveyance, wherein the drive members are configured for moving the second carriage body with respect to the first carriage body.

7. The positioning apparatus of claim 1 wherein the positioning apparatus is configured to enable or allow the positioner member to move with respect to the second carriage body and in a direction parallel to a plane of conveyance of the glass sheet when the positioner member is in the lowered use position to compensate for a speed difference between the conveyor and the first carriage body when the first carriage body is being translated in the direction of conveyance and the positioner member is in contact with the conveyor.

8. The positioning apparatus of claim 7 further comprising a support configured to be rotatably connected to the second carriage body and associated with the positioner member, and a sway drive assembly that is engageable with the support to cause the positioner member to return to a home position, wherein the sway drive assembly is disengageable from the support to allow the positioner member to move away from the home position and with respect to the second carriage body to compensate for the speed difference between the conveyor and the first carriage body when the first carriage body is being translated in the direction of conveyance and the positioner member is in contact with the conveyor.

9. The positioning apparatus of claim 8 wherein the support comprises a main body and a projection on the main body, and the sway drive assembly includes an actuator that is engageable with the projection when the support is connected to the second carriage body to rotate the support and return the positioner member to the home position.

10. A glass sheet processing system for processing a heated glass sheet, the glass sheet processing system including:
a conveyor for conveying the glass sheet in a direction of conveyance;
a forming station for molding the glass sheet; and
a positioning apparatus for adjusting position of the glass sheet on the conveyor upstream of the forming station, the positioning apparatus including a movable carriage having first and second carriage bodies, wherein the first carriage body is translatable in the direction of conveyance, and the second carriage body is supported by the first carriage body such that the second carriage body is movable in a direction generally transverse to the direction of conveyance, the positioning apparatus further including a first drive assembly for moving the first carriage body in the direction of conveyance, a second drive assembly for moving the second carriage body with respect to the first carriage body, and a positioner member connected to the second carriage body and configured to contact the glass sheet to adjust position of the glass sheet with respect to the conveyor, wherein the drive assemblies are configured to be operated independently, and the positioner member is movable between a raised position and a lowered use position, and wherein the positioner member is configured to contact the conveyor when the positioner member is in the lowered use position.

11. The glass processing system of claim 10 wherein the positioner member is movable with respect to the second carriage body to compensate for a speed difference between the conveyor and the first carriage body when the first carriage body is being translated in the direction of conveyance and the positioner member is in contact with the conveyor.

12. The glass processing system of claim 11 wherein the positioning apparatus further comprises a support member connected to the positioner member and pivotally associated with the second carriage body such that the support member is pivotable about a vertical axis when the positioner member is in the lowered use position.

13. The glass processing system of claim 12 wherein the support member is further pivotable about a horizontal axis to move the positioner member between the raised position and the lowered use position.

14. The glass processing system of claim 12 wherein the positioning apparatus further comprises a pivotable joint connected to the support member, a vertically extending support connected to the pivotable joint, and first and second actuators that are engageable with the support to rotate the support and the pivotable joint.

15. The glass processing system of claim 14 wherein the actuators are disengageable from the support to allow pivoting motion of the pivotable joint and the support member when the positioner member is in contact with the conveyor.

16. The glass processing system of claim 10 wherein the first drive assembly includes a first motor, and the second drive assembly includes a second motor.

17. The glass processing system of claim 16 wherein the first drive assembly further comprises a first drive belt connected to the first motor and the first carriage body for translating the first carriage body, and the second drive assembly further comprises a second drive belt connected to the second motor and the second carriage body for moving the second carriage body with respect to the first carriage body.

18. The glass processing system of claim 10 further comprising a support structure including first and second longitudinally extending guides that are vertically spaced apart from each other, and wherein the first carriage body is engageable with the first and second guides as the first carriage body translates.

19. The glass processing system of claim 10 wherein the positioning apparatus is configured to enable or allow the positioner member to move with respect to the second carriage body and in a direction parallel to a plane of conveyance of the glass sheet when the positioner member is in the lowered use position to compensate for a speed difference between the conveyor and the first carriage body when the first carriage body is being translated in the direction of conveyance and the positioner member is in contact with the conveyor.

20. The glass processing system of claim 19 wherein the positioning apparatus further comprises a support rotatably connected to the second carriage body and also connected to the positioner member, and a sway drive assembly that is engageable with the support to cause the positioner member to return to a home position, wherein the sway drive assembly is disengageable from the support to allow the positioner member to move away from the home position and with respect to the second carriage body to compensate for the speed difference between the conveyor and the first carriage body when the first carriage body is being translated in the direction of conveyance and the positioner member is in contact with the conveyor.

21. The glass processing system of claim 20 wherein the support comprises a main body and a projection on the main body, and the sway drive assembly includes an actuator that is engageable with the projection to rotate the support and return the positioner member to the home position.

22. A method for adjusting position of a heated glass sheet on a conveyor of a glass sheet processing system that includes a forming station for molding the glass sheet, the method comprising:
   moving a carriage including first and second carriage bodies along the glass sheet processing system, using a first motor associated with the first carriage body, to achieve a desired speed of the carriage;
   moving the second carriage body with respect to the first carriage body using a second motor associated with the second carriage body;
   contacting the glass sheet with a positioner member connected to the second carriage body to adjust the position of the glass sheet with respect to the conveyor; and
   moving the positioner member between a raised position and a lowered use position, in which the positioner member contacts the conveyor, before contacting the glass sheet with the positioner member.

23. The method of claim 22 further comprising allowing the positioner member to move with respect to the second carriage body and in a direction parallel to a plane of conveyance of the glass sheet when the positioner member is in the lowered use position.

24. The method of claim 23 wherein the allowing step is performed to compensate for a speed difference between the conveyor and the first carriage body as the carriage is moved along the glass sheet processing system in a direction of conveyance of the glass sheet on the conveyor.

25. The method of claim 24 wherein a support is rotatably connected to the second carriage body and also connected to the positioner member, and the method further comprises engaging a sway drive assembly with the support to cause the positioner member to move to a home position, and disengaging the sway drive assembly from the support to allow the positioner member to move away from the home position and with respect to the second carriage body to compensate for the speed difference between the conveyor and the first carriage body as the carriage is moved along the glass sheet processing system.

26. The method of claim 22 wherein the conveyor is configured to convey the glass sheet in a direction of conveyance, and wherein moving the second carriage body with respect to the first carriage body is performed using two drive members that are associated with the second motor and that are spaced apart from each other in the direction of conveyance.

27. The method of claim 22 wherein moving the carriage is performed so that the carriage reaches a speed that approximates a speed of the glass sheet in a direction of conveyance on the conveyor, and moving the positioner member between the raised position and the lowered use position is performed after a desired speed of the carriage in the direction of conveyance is achieved.

28. A glass sheet processing system for processing a heated glass sheet, the glass sheet processing system including:
   a conveyor for conveying the glass sheet in a direction of conveyance;
   a forming station for molding the glass sheet;
   a positioning apparatus for adjusting position of the glass sheet on the conveyor upstream of the forming station, the positioning apparatus including a movable carriage having first and second carriage bodies, wherein the first carriage body is translatable in the direction of conveyance, and the second carriage body is supported by the first carriage body such that the second carriage body is movable in a direction generally transverse to the direction of conveyance, the positioning apparatus further including a first drive assembly for moving the first carriage body in the direction of conveyance, a second drive assembly for moving the second carriage body with respect to the first carriage body, and a positioner member connected to the second carriage body and configured to contact the glass sheet to adjust position of the glass sheet with respect to the conveyor, wherein the drive assemblies are configured to be operated independently; and
   a support structure including first and second longitudinally extending guides that are vertically spaced apart from each other, and wherein the first carriage body is engageable with the first and second guides as the first carriage body translates.

* * * * *